United States Patent
Lim et al.

(10) Patent No.: US 7,307,134 B2
(45) Date of Patent: Dec. 11, 2007

(54) MIXED ALKOXYSILYL FUNCTIONAL POLYMERS

(75) Inventors: Thomas F. Lim, Killingworth, CT (US); Thomas Bachon, Dusseldorf (DE); Bernd Beuer, Monheim (DE); Johann Klein, Dusseldorf (DE)

(73) Assignees: Henkel Corporation, Rocky Hill, CT (US); Henkel KGaA, Duesseldorf (DE)

( * ) Notice: Subject to any disclaimer, the term of this patent is extended or adjusted under 35 U.S.C. 154(b) by 0 days.

(21) Appl. No.: 10/469,096

(22) PCT Filed: Feb. 22, 2002

(86) PCT No.: PCT/US02/03398

§ 371 (c)(1),
(2), (4) Date: Aug. 25, 2003

(87) PCT Pub. No.: WO02/068501

PCT Pub. Date: Sep. 6, 2002

(65) Prior Publication Data

US 2004/0116639 A1    Jun. 17, 2004

(51) Int. Cl.
*C08G 77/60* (2006.01)
(52) U.S. Cl. .......................................... 528/34; 528/29
(58) Field of Classification Search ................ 528/17, 528/18, 29, 34, 35
See application file for complete search history.

(56) References Cited

U.S. PATENT DOCUMENTS

| | | | | |
|---|---|---|---|---|
| 3,804,639 A * | 4/1974 | Trulsson et al. | .......... | 106/14.27 |
| 4,444,974 A * | 4/1984 | Takase et al. | .................. | 528/33 |
| 4,528,081 A | 7/1985 | Lien et al. | ............. | 204/159.13 |
| 4,530,959 A | 7/1985 | Armbruster et al. | ........ | 524/526 |
| 4,616,065 A | 10/1986 | Hargis et al. | .................. | 525/99 |
| 4,675,346 A | 6/1987 | Lin et al. | ...................... | 522/39 |
| 4,699,802 A | 10/1987 | Nakos et al. | ............... | 427/54.1 |
| 4,748,199 A | 5/1988 | Takiguchi et al. | .......... | 524/318 |
| 4,866,131 A | 9/1989 | Fujimaki et al. | ............... | 525/96 |
| 4,894,420 A | 1/1990 | Scriver | ........................ | 525/237 |
| 4,925,894 A | 5/1990 | Futamura | ..................... | 524/484 |
| 5,009,874 A | 4/1991 | Parmentier et al. | ......... | 423/335 |
| 5,082,901 A | 1/1992 | Linster | ........................ | 525/237 |
| 5,162,409 A | 11/1992 | Mroczkowski | ............... | 524/262 |
| 5,990,257 A * | 11/1999 | Johnston et al. | ............... | 528/28 |
| 6,005,132 A * | 12/1999 | Weidner et al. | ............. | 556/469 |
| 6,191,220 B1* | 2/2001 | Takei et al. | .................. | 525/100 |
| 6,828,403 B2* | 12/2004 | Mahdi et al. | .................. | 528/18 |
| 2002/0137841 A1* | 9/2002 | Nakagawa et al. | ......... | 525/100 |

FOREIGN PATENT DOCUMENTS

| | | | |
|---|---|---|---|
| DE | 198 31 285 A1 | 1/2000 | |
| EP | 0 293 733 A2 | 5/1988 | |
| EP | 0 732 348 B1 | 8/2000 | |
| EP | 1 035 170 A2 | 9/2000 | |
| JP | 62230845 A * | 10/1987 | |
| JP | 03160022 A * | 7/1991 | |
| JP | 11035630 A * | 2/1999 | |
| JP | 2000034459 A * | 2/2000 | |

OTHER PUBLICATIONS

Abstract for JP 67-012406 B.*
English translation of JP 62-230845.*
Specification and claims for abandoned U.S. Appl. No. 09/300,340, filed Apr. 27, 1999.*
Sheng-Shu Hou et al., "Function and performance of silicone copolymers, 3", "Synthesis and properties of a novel siliconized acrylic monomer containing three reactive sites", Macromol. Chem. Phys. 1999, 200 No. 11, pp. 2501-2507.

* cited by examiner

*Primary Examiner*—Marc S. Zimmer
(74) *Attorney, Agent, or Firm*—Steven C. Bauman

(57) ABSTRACT

This invention relates to silylated polymers having mixed alkoxy groups on the silyl portion thereof, methods of their preparation, and compositions and reaction products formed therefrom. These alkoxysilylated polymers can be crosslinked when exposed to atmospheric moisture to become useful elastomers, sealants or adhesives. The presence of different alkoxy groups on the silicon atoms can control or otherwise moderate the cure speeds of these silylated polymers.

1 Claim, No Drawings

MIXED ALKOXYSILYL FUNCTIONAL POLYMERS

BACKGROUND OF THE INVENTION

1. Field of the Invention

This invention relates to silylated polymers having mixed alkoxy groups on the silyl portion thereof, methods of their preparation, and compositions and reaction products formed therefrom. These alkoxysilylated polymers can be crosslinked when exposed to atmospheric moisture to become useful elastomers, sealants or adhesives. The presence of different alkoxy groups on the silicon atoms can control the cure speeds of these silylated polymers.

2. Background of Related Technology

Alkoxysilylated polymers, in the presence of a catalyst, can be crosslinked by atmospheric moisture under ambient conditions. Compositions based on these type of polymers are often referred to as RTV sealants (or adhesives). The most well known example is RTV silicone sealants.

Crosslinking of alkoxysilylated polymers involves hydrolysis and condensation reactions of the alkoxylsilyl group. The cure speed of compositions prepared therefrom has conventionally been accelerated through the use of various types and amounts of moisture cure catalysts. However, among the disadvantages of using increased amounts of such catalysts to obtain greater cure speeds are potential instability, loss of shelf life and enhanced manufacturing and material costs of such compositions.

The smaller alkoxy groups, e.g. methoxy, are ordinarily more reactive and thus better able to be displaced by another chemical entity. Therefore, methoxy groups are more desirable for obtaining moisture curable polymers having faster and/or more controlled cure speeds. Currently, however, the starting materials for making many lower alkoxy group-containing polymers with a variety of backbones, such as polyethers like polypropylene oxide ("PPO"), are not readily commercially available. For example, a desirable route for making silyl-terminated PPO polymers containing alkoxy groups might include reacting an isocyanatoalkyltrialkoxysilane with an hydroxy terminated PPO. However, presently trimethoxysilyl-terminated isocyanatoalkyl compounds are not widely commercially available.

Thus, there is a need for a method of conveniently producing a moisture curable composition which includes a curable polymer having a mixture of different alkoxy groups present, at least one of which being a methoxy group, whereby controlled moisture cure speed is obtained.

SUMMARY OF THE INVENTION

In accordance with the present invention, moisture cure speed can be controlled to proceed in a more or less rapid manner, depending on the identity and number of the alkoxy groups on the curable alkoxysilyl polymer. For example, methoxy and ethoxy groups are contemplated as being present concurrently on the silyl groups of the polymers of the present invention, though the methoxy groups provide more rapid cure.

One aspect of the invention relates to the presence of different alkoxy groups on the silicon atom of a silyl endcapped moisture curable polymer, whereby controlled cure speed of the moisture curable polymer is obtained. The presence of larger alkoxy groups, such as ethoxy or greater, slow down the cure while smaller alkoxy groups, such as methoxy, accelerate it. The overall cure speed is related to the type or combination of alkoxy group(s) or groups on the silicon. As noted above, the cure speed is faster if the alkoxy group is a better leaving group. Typically, a smaller alkoxy group is a better leaving group. For example, a methoxysilylated polymer cures faster than an ethoxysilylated polymer or a butoxysilylated polymer.

Another aspect of the invention relates to a moisture curable composition which includes an alkoxylsilyl terminated polymer containing more than one type of alkoxy group. Desirably, the alkoxy groups are at the terminal ends of the polymer, though pendant groups are also contemplated. The backbone of the polymer can be varied and may be chosen from a wide range of materials. PPO is among the desirable backbones.

A further aspect of the present invention relates to a reaction product formed from the aforementioned polymer having mixed alkoxysilyl functional groups and a catalyst.

In still another aspect of the invention, there is provided a method for preparing mixed alkoxysilyl polymers via an alkoxy exchange reaction. This process includes mixing a polymer having at least one alkoxysilyl group present, an alkoxysilane and a catalyst. Desirably, the alkoxysilane contains a methoxy group which exchanges with a higher carbon number alkoxy on the alkoxysilyl polymer. The resultant alkoxy exchange reaction desirably provides a mixture of different alkoxy groups, e.g. methoxy, ethoxy and the like on the reactive polymer. The alkoxy exchange can occur slowly at room temperature, but desirably occurs at higher temperatures in the presence of a catalyst.

In yet another aspect of the invention, there is included a reactive polymer having the structure:

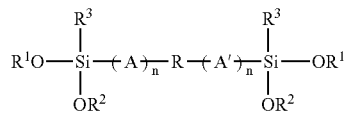

wherein R is a hydrocarbon diradical which may include heteroatom and/or silicone-containing groups or linkages; A and A' may be each $C_{1-30}$ linear or branched, substituted or unsubstituted aliphatic groups or aromatic-containing groups, with or without interruption by a carboxy, carbamate, carbonate, ureido, urethane or sulfonate linkage; n may be 0 or 1; $R^1$ and $R^2$ may be each substituted or unsubstituted methyl, $C_{3-12}$ alkyl or aryl groups wherein $R^1$ and $R^2$ are not the same; $R^3$ is a $C_{1-12}$ alkyl, alkenyl, alkoxy, aminoalkyl or aryl group, or a (meth)acryloxyalkyl group.

This polymer can be combined with a catalyst and other components to form a curable composition.

A further aspect of the invention includes a curable composition which includes:

(a) a polymer having the structure

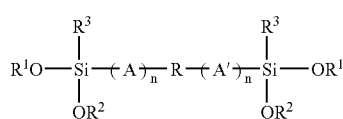

I wherein R is a hydrocarbon diradical which may include heteroatom and/or silicone-containing groups or linkages; A and A' may be each $C_{1-30}$ linear or branched, substituted or unsubstituted aliphatic groups or aromatic-containing groups, with or without interuption by a carboxy, carbamate, carbonate, ureido, urethane or sulfonate linkage; n may be 0 or 1; $R^1$ and $R^2$ may be each substituted or unsubstituted $C_{1-12}$ alkyl or aryl groups; $R^3$ is a $C_{1-12}$ alkyl, alkenyl, alkoxy, aminoalkyl or aryl group, or a (meth)acryloxyalkyl group.

(b) a catalyst.

A further aspect of the invention includes the reaction product of:

(a) a polymer having at least one pendent or terminal alkoxysilyl group thereon and being a member selected from the group consisting of polyethers, polyolefins, polyesters, polyurethanes, polysiloxanes, poly(meth)acrylates, polyepoxides and combinations thereof;

(b) an alkoxysilane; and (c) a catalyst.

Still a further aspect of the invention includes a method of making an alkoxysilyl endcapped polymer, which includes the steps of reacting a first reactant having the structure:

HO—R—OH wherein R is a hydrocarbon diradical which may include heteroatom and/or silicone-containing groups or linkages, with a second reactant having one end terminating with an isocyanate group and another end terminating with a silyl group having at least two alkoxy groups attached to a silicon atom thereof, and providing a third reactant, such as an alkoxy silane. An example of the first reactant is hydroxyl terminated PPO; an example of the second reactant is isocyanatopropyltriethoxy silane; and examples of the third reactant include methyltrimethoxy silane, methyltriethoxy silane, vinyltrimethoxy silane, vinyltriethoxy silane, and the like.

Another aspect of the invention includes reacting an organic alcohol terminated compound such as PPO terminated with OH groups, with an isocyanatoalkyltrialkoxysilane, such as isocyanatopropyltriethoxysilane, in the presence of a catalyst such as a tin catalyst, or desirably a titanium alkylate such as titanium tetraisopropoxide, or a metal alkoxide such as sodium methoxide. The resultant composition provides a polymer which can then undergo alkoxy exchange when placed in the presence of a different alkoxy group such as a methoxysilane. This results in a mixed alkoxysilyl polymer composition having controlled, moderated or accelerated moisture cure speed.

The preparation of the mixed alkoxysilyl polymer can also be performed concurrently with the compounding of a moisture curable composition. For example, the polymer having at least one alkoxysilyl group, the alkoxysilane and the catalyst can be admixed with other components used to make the final moisture curable product. In this method, the alkoxy exchange occurs in situ in the final product without subjecting the controlled moisture curing reactive polymer per se to a pre-reaction or formation step prior to compounding.

Another aspect of the invention includes mixing a polymer having at least one alkoxysilyl group with an alcohol in the presence of a catalyst. The mixture is then aged at ambient temperature or elevated temperature to permit alkoxy exchange, thereby forming a mixed alkoxysilyl-containing reactive polymer.

DETAILED DESCRIPTION OF THE INVENTION

The invention relates to mixed alkoxysilyl polymers, curable polymers and compositions made therefrom.

The present invention recognizes that the cure speeds of polymers can be manipulated by putting different alkoxy groups on the silyl end groups of polymers encapped therewith. Cure speeds decrease in the order of MeO>EtO and higher. In one aspect of the invention, there is a method of providing mixed alkoxsilyl endcapping of polymers by reacting an hydroxy terminated polypropylene oxide polymer with a 3-isocyanatopropyltriethoxysilane and mixing the resultant reaction product with an alkoxysilane having a different alkoxy group, e.g. a methoxy group, than the reaction product, and allowing alkoxy exchange to occur, desirably in the presence of a catalyst, to form the mixed alkoxysilyl polymer. Cure speed of the resultant polymer is intermediate between those endcapped with pure 3-isocyanatopropyltrimethoxysilane and those encapped with pure 3-isocyanatopropyltriethoxysilane.

Curable polymers made and used in accordance with the present invention include, but are not limited to, those having the structure:

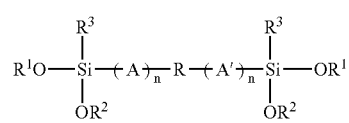

I wherein R is a hydrocarbon diradical which may include heteroatom and/or silicone-containing groups or linkages; A and A' may be each $C_{1-30}$ linear or branched, substituted or unsubstituted aliphatic groups or aromatic-containing groups, with or without interuption by A may also be a carboxy, carbamate, carbonate, ureido, urethane or sulfonate linkage; n may be 0 or 1; $R^1$ and $R^2$ may be each substituted or unsubstituted $C_{1-12}$ alkyl or aryl groups; $R^3$ is a $C_{1-12}$ alkyl, alkenyl, alkoxy, aminoalkyl or aryl group, or a (meth) acryloxyalkyl group.

Additional examples of R backbones include alkyd resins, oil modified alkyd resins, unsaturated polyesters, natural oils, (e.g., linseed, tung, soybean), epoxides, nylons, thermoplastic polyesters (e.g., polyethyleneterephthalate, polybutyleneterephthalate), polycarbonates, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, and the like), phenolic resins, polyoxymethylene (homopolymers and copolymers), polyurethanes, polysulfones, polysulfide rubbers, nitrocelluloses, vinyl butyrates, vinyls (e.g., vinyl chloride and/or vinyl acetate containing polymers), ethyl cellulose, the cellulose acetates and butyrates, viscose rayon, shellac, waxes, ethylene copolymers (e.g., ethylenevinyl acetate copolymers, ethyleneacrylic acid copolymers, ethyleneacrylate copolymers), organic rubbers, silicone greases, resins and rubbers and the like. Still additional examples of R include polyethers, such as polyethylene oxide ("PEO"), PPO and polyTHF.

R may also include natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinylpyridine and its derivatives, acrylonitrile, isobutylene and alkyl-substituted acrylates such as methylmethacrylate. Examples include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530, 959; 4,616,065; 4,748,199; 4,866,131; 4,894,420; 4,925, 894; 5,082,901; and 5,162,409.

Other suitable organic polymers useful as R backbones are copolymers of ethylene with other high alpha olefins such as propylene, butene-1 and pentene-1 and a diene monomer. The organic polymers may be block, random, or sequential and may be prepared by emulsion (e.g. e-SBR) or solution polymerization processes (e.g., s-SBR). Additional polymers which may be used include those which are partially or fully functionalized including coupled or star-branched polymers. Additional specific examples of functionalized organic rubbers include polychloroprene, chlorobutyl and bromobutyl rubber as well as brominated isobutylene-co-paramethylstyrene rubber. The preferred organic rubbers are polybutadiene, s-SBR and mixtures thereof.

Silicone rubbers which are useful as R include organic polysiloxane compositions in which the organic polysiloxane is linear or branched, and optionally may contain, in addition to the hydrocarbon groups, certain reactive groups such as for example, hydroxyl, hydrolyzable groups, alkenyl groups such as vinyl, hydrogen, fluoro, and phenyl. Further examples are given in U.S. Pat. No. 5,009,874, the disclosure of which is hereby expressly incorporated herein by reference.

Other useful R backbone polymers include acrylonitrile-butadiene rubber ("NBR"), fluorine-containing rubber, epychlorohydrin rubber, butyl rubber, halogenated butyl rubber, brominated isobutylene/p-methylstyrene copolymer rubber, chloroprene rubber, ethylene/acrylate copolymer rubber and epoxidized natural rubber, ethylene/propylene/diene rubber ("EPDM") and the like.

The curable polymers of the present invention desirably have a viscosity in the range of about 10 cps to about 1,000,000 cps and more desirably about 1,000 cps to about 100,000 cps.

The invention further includes alkoxysilyl polymers and polymer compositions, and methods of preparing same through an alkoxy exchange reaction. One method of the present invention includes mixing a composition which includes:

(a) a polymer within structure I,
(b) an alkoxysilane in a sufficient amount to permit alkoxy exchange with the alkoxylsilyl groups of structure I, and
(c) a catalyst.

This invention includes the composition based on the mixed alkoxysilyl polymer formed from mixing components (a), (b) and (c).

Component (a) may be chosen from a wide variety of reactive polymers, as set forth herein.

In structure I, linkage A between the alkoxysilyl group and the polymer backbone R is desirably resistant to common chemicals such as water, solvents, and mild acids and bases. Linkage A is intended to be a stable linkage. Linkage A may optionally be present in cases where R is terminated with appropriate atoms, such as O, to ensure a stable bond with the terminal alkoxysilyl groups. Particularly desirable examples of A include $C_{1-4}$ alkylene linkages, such as ethylene or propylene. Other particularly desirable examples of A include those having carboxy, carbonate, carbamate, ureido, urethane or sulfonate linkage contained within. When including these groups, A is desirably attached to the terminal silyl group by a branched liner, substituted or unsubstituted, aliphatic, cycloaliphatic or aromatic group in order to improve stability of the spacer. Examples of such A groups include:

The inventive alkoxy silyl polymers may further include moisture and/or UV/moisture curable polymers, such as silicon polymers (see U.S. Pat. Nos. 4,528,081, 4,675,346, and 4,699,802, the disclosure of each of which being expressly incorporated herein by reference).

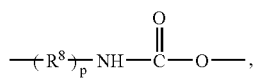

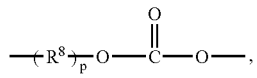

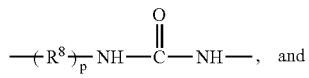

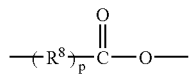

wherein $R^8$ is a branched or linear, substituted or unsubstituted aliphatic, cycloaliphatic or aromatic group and $p$ is an integer from 1-4. $R^8$ is desirably methylene, ethylene or propylene.

Component (b) is an alkoxysilane with the structure of $R^4{}_n Si(OR^1)_{4-n}$, where n=0, 1 or 2. The preferred alkoxysilane has n=0 or 1. $R^4$ is a monovalent radical. It includes aryl, alkyl, vinyl, allyl, organofunctional aryl and organofunctional alkyl. Some examples of $R^4$ are 3-aminopropyl, methacryloxypropyl and chloropropyl. $R^1$ is a monovalent radical different from $R^2$, except it may be the same as $R^2$ where A is a carboxy, carbamide, ureido or urethane group. It includes aryl and alkyl. Lower alkyl $C_{1-3}$, such as ethoxy, is desirable.

Component (c) may be selected from a variety of known catalysts. For instance, the catalyst may be chosen from transition metal complexes, tin catalysts (such as dialkyl tin dicarboxylates), titanium catalysts (such as metal alkoxide catalysts), bases, acids (such as carboxylic acids), quaternary salts, amines, phosphines, titanates (such as alkyl titanates), and tetraalkylphosphonium salts. Catalysts may be present in amounts of about 0.01 to about 1.0% and desirably about 0.5 to about 0.5% by weight of the total composition. It further includes other conventional catalysts known to be active in reactions of alkoxysilanes. Photoinitiators, such as visible and UV photoinitiators, may also be used.

According to the method of the present invention, the combination or mixture of the three components, (a), (b) and (c), is aged at ambient temperature or at elevated temperatures. The resulting composition desirably includes polymer and silane containing both $R^2O$ and $R^1O$ groups. This mixture cures by atmospheric moisture at a different speed from that of the original unaged mixture or the starting materials. The difference in cure speed depends on the nature of the $R^2O$ and $R^1O$ groups.

In preparing the reactive polymers of structure I, it is desirable to do so using a catalyst other than a tin-based catalyst. Although tin-based catalysts are useful for moisture curing the formed reactive polymers, when used in the preparation of such reactive polymers residual catalyst from their manufacture may result in poor shelf life and instability in the final curable composition. It has been discovered that a further advantage of the present invention may be captured when catalysts, such as titanium catalysts including titanium tetraisopropoxide, or metal alkoxide catalysts such as sodium methoxide are employed. The aforementioned catalysts are easily quenched subsequent to the formation of the reactive polymer, thereby preventing active residue catalyst from causing premature curing. Additionally, titanium tetraisopropoxide is a particularly useful catalyst for enhancing the rate of the transesterification reaction, though a less efficient condensation catalyst. This allows for the enhanced rate of formation of the mixed alkoxy end groups without sacrificing stability. These catalyst are available commercially from E.I. DuPont de Nemours. Though the catalysts may be used in the range of about 0.01 to about 0.5%, desirably about 0.1 to about 0.3%, the catalysts (which are non tin based ones) have the added advantage of achieving similar cure speeds using smaller amounts of catalyst, e.g., about 0.1 to about 0.2% as compared with 0.5% (tin-based).

Another method of preparing mixed alkoxysilyl polymers through an alkoxy exchange reaction includes mixing:

(a) a polymer having at least one alkoxysilyl group, (b) an alcohol, and (c) a catalyst.

Component (b) is an alcohol with the structure of $R^7OH$. $R^7$ is a monovalent radical different from $R^2$. It includes aryl and alkyl. Alkyl is preferred.

According to this method of the present invention, the mixture of the three components, (a), (b) and (c), is aged at ambient temperature or at elevated temperatures. The resulting composition includes catalyst, polymer containing both $R^2O$ and $R^1O$ groups, and $R^2OH$ and $R^1OH$. The alcohols are removed with by evaporation at various temperatures and under various pressures. This resulting composition cures by atmospheric moisture at a different t speed from that of the original mixture. The difference in cure speed depends on the nature of the $R^2O$ and $R^1O$ groups.

The invention also provides a method of controlling the cure speed of an alkoxy silyl functional polymer, the steps of which include providing an alkoxy silyl functional polymer having two or more different alkoxy groups; providing a cure catalyst therefor; and exposing the alkoxy silyl functional polymer and the catalyst to conditions sufficient to cure the alkoxy silyl functional polymer. The identity and/or amount of the two or more different alkoxy groups controls the cure speed of the alkoxy silyl functional polymer having two or more different alkoxy groups thereon.

The compositions in the present invention can include various other components useful in the manufacturing of moisture curable products. For example, various moisture catalysts, fillers, stabilizers, inhibitors, reactive diluents, viscosity modifiers and the like may be incorporated at useful ranges for their intended purposes.

It is known that triethoxysilane endcapped polypropylene oxide polymers moisture cure at much slower speeds than trimethoxysilane endcapped counterparts. The present invention seeks to provide a mixture of alkoxysilyl terminated polymers to control and desirably to accelerate the moisture curing capability of the resultant reactive polymers.

EXAMPLES

Example 1

ViSi(OE)$_3$ was mixed with equal weight of ViSi(OMe)$_3$ or MeOH in the presence of 1% UL-45 (a tin catalyst from Witco). The silane compositions were monitored using $^{29}$Si NMR spectroscopy. As seen from data set forth in Table 1, alkoxy exchange occurred.

Example 2

Polymer A (a triethoxysilylated polypropylene oxide) was prepared by heating a mixture of 400 grams ACCLAIM 4200 (a polypropylene oxide polymer with OH endgroups from Lyondell) with 52 grams SILQUEST A1310 (isocyanatopropyltriethoxy silane from Witco) in the presence of 1.5 grams UL-28 (a Sn catalyst from Witco) at 30-60 C for 3 hours. Sample Nos. 10-12 were prepared in this way with the amounts noted in Table 2a, with Sample No. 10 acting as a control. Mixture of Polymer A with UL-45 (a tin catalyst from Witco) and methoxysilanes were used in several NMR experiments. The results set forth in Table 2b indicate that extensive alkoxy exchange reactions occurred at the 50° C. temperature and over the period of time in days noted.

TABLE 1

| | Alkoxy Exchange Reactions | | | | | | |
|---|---|---|---|---|---|---|---|
| Sample | | Reaction | Reaction | Mol Percent in Product Mixture | | | |
| No. | Composition* | time (min.) | (° C.) T | ViSi(OMe)$_3$ | ViSi(OMe)$_2$OEt | ViSi(OMe)(OEt)$_2$ | ViSi(OEt)$_3$ |
| 1 | 50% ViSi(OEt)$_3$ + 50% ViSi(OMe)$_3$ | 30 | RT | 54.96 | 0.95 | 1.04 | 43.05 |
| 2 | 50% ViSi(OEt)3 + 50% ViSi(OMe)$_3$ | 60 | RT | 52.21 | 3.03 | 1.94 | 42.82 |
| 3 | 50% ViSi(OEt)$_3$ + 50% ViSi(OMe)$_3$ | 480 | RT | 46.79 | 8.86 | 6.16 | 38.19 |
| 4 | 50% ViSi(OEt)$_3$ + 50% ViSi(OMe)$_3$ | 1020 | RT | 40.99 | 16.17 | 9.79 | 33.05 |
| 5 | 50% ViSi(OEt)$_3$ + 50% ViSi(OMe)$_3$ | 3120 | RT | 25.6 | 32.28 | 18.91 | 19.21 |
| 6 | 50% ViSi(OEt)$_3$ + 50% ViSi(OMe)$_3$ | 14400 | RT | 16.73 | 39.65 | 32.69 | 10.92 |
| 7 | 50% ViSi(OEt)$_3$ + 50% ViSi(OMe)$_3$ | 60 | 80 | 27.61 | 32.16 | 18.81 | 21.43 |
| 8 | 50% ViSi(OEt)$_3$ + 50% MeOH | 1440 | RT | 21.42 | 24.06 | 22.31 | 32.21 |
| 9 | 50% ViSi(OEt)$_3$ + 50% MeOH | 240 | 50 | 26.74 | 42.88 | 22.74 | 7.64 |

*All samples contained 1% of UL-45 (Sn catalyst).
ViSi(OEt)$_3$ is vinyl triethoxy silane.

TABLE 2a

Alkoxy Exchange Reactions

| Component | Sample No./Wt. % | | |
|---|---|---|---|
| | 10 | 11 | 12 |
| Polymer A | 99.80 | 98.71 | 98.71 |
| UL-45 (Sn catalyst) | 0.20 | 0.20 | 0.20 |
| ViSi(MeO)$_3$ | | 1.10 | |
| Aminopropyltromethoxy Silane | | | 1.10 |
| Total | 100.00 | 100.00 | 100.00 |

TABLE 2b

Alkoxy Exchange Reactions

| | Sample No./relative molar concentration | | | | | | | |
|---|---|---|---|---|---|---|---|---|
| | 10 | 10 | 11 | 11 | 11 | 11 | 12 | 12 |
| Age at 50° C., days | 8 | 35 | 9 | 17 | 22 | 44 | 18 | 43 |
| (EtO)$_3$Si - capped PPO | 1 | 1 | 1 | 1 | 1 | 1 | 1 | 1 |
| (EtO)$_2$(MeO)Si - capped PPO | | | 0.202 | 0.312 | 0.415 | 0.407 | 0.296 | 0.35 |
| (EtO)(MeO)$_2$Si - capped PPO | | | 0.054 | 0.048 | 0.069 | 0.063 | 0.03 | 0.039 |
| ViSi(MeO)$_3$* | | | 0 | 0 | 0 | 0 | | |
| ViSi(MeO)$_2$(EtO) | | | 0.088 | 0.023 | 0.053 | 0.053 | | |
| ViSi(MeO)(EtO)$_2$ | | | 0.091 | 0.064 | 0.103 | 0.125 | | |
| H$_2$NPrSi(MeO)$_3$* | | | | | | | 0 | 0 |
| H$_2$NPrSi(MeO)$_2$(EtO) | | | | | | | 0.031 | 0.092 |
| H$_2$NPrSi(MeO)(EtO)$_2$ | | | | | | | 0.172 | 0.393 |

*consumed during reaction

Example 3

Polymer B (a triethoxysilylated polypropylene oxide) was prepared by heating a mixture of 450 grams ACCLAIM 12200 (a polypropylene oxide polymer with OH endgroups from Lyondell) with 20.2 grams SILQUEST A1310 (isocyanatopropyltriethoxy silane from Witco) in the presence of 0.1 grams UL-28 (a tin catalyst from Witco) at 30-60° C. for 3 hours.

Both Polymer A and Polymer B were used to prepare moisture curable compositions (Sample No. 13—Sample No. 22 in Table 3a). Cure speeds of these compositions accelerated with time. The cure acceleration was observed to be faster at 50° C. than at room temperature. Table 3b shows these and other observations of performance.

TABLE 3a

Cure Times of Aged Compositions
(Effects of Alkoxy Exchange Reactions)

| Components | Sample No./Wt. % | | | | | | | | | |
|---|---|---|---|---|---|---|---|---|---|---|
| | 13 | 14 | 15 | 16 | 17 | 18 | 19 | 20 | 21 | 22 |
| Polymer B - (EtO)$_3$Si PPO capped | | | | | | 99.26 | 98.77 | 98.28 | 98.77 | 98.28 |
| Polymer A - (EtO)$_3$Si PPO capped | 99.70 | 94.79 | 94.97 | 94.79 | 93.50 | | | | | |
| Sn catalyst | 0.30 | 0.47 | 0.28 | 0.47 | 0.50 | 0.50 | 0.49 | 0.49 | 0.49 | 0.49 |
| ViSi(MeO)$_3$ | 0.00 | 4.74 | 0.00 | 0.00 | 1.00 | | 0.49 | 0.98 | | |
| ViSi(EtO)$_3$ | | | | | | | | | 0.49 | 0.98 |
| NH$_2$PrSi(MeO)$_3$ | | | | | | 0.25 | 0.25% | 0.25 | 0.25 | 0.25 |
| MeOH | 0.00 | 0.00 | 4.75 | 4.74 | 5.00 | | | | | |

TABLE 3b

Cure Times of Aged Compositions
(Effects of Alkoxy Exchange Reactions)

| Physical Properties | Sample No. | | | | | | | | | |
|---|---|---|---|---|---|---|---|---|---|---|
| | 13 | 14 | 15 | 16 | 17 | 18 | 19 | 20 | 21 | 22 |
| Aged Temperature, °C. | RT | RT | RT | RT | RT | RT | RT | RT | RT | RT |
| Aged Time, days | 0 | 0 | 0 | 0 | 0 | 0 | 0 | 0 | 0 | 0 |
| Skin Over Time, min. | 480 | 1440 | 450 | 300 | 50 | 30 | 100 | 200 | 95 | 125 |
| Tack Free Time, min. | | | 1200 | 420 | 120 | 195 | 295 | 420 | 320 | 390 |
| Aged Temperature, °C. | RT | RT | RT | RT | RT | RT | RT | RT | RT | RT |
| Aged Time, days | 1 | 1 | 1 | 1 | 1 | 1 | 1 | 1 | 1 | 1 |
| Skin Over Time, min. | 360 | 1440 | 360 | 120 | 50 | 25 | 88 | 180 | 80 | 100 |
| Tack Free Time, min. | 1440 | | | | 90 | 180 | 300 | 450 | 330 | 400 |
| Aged Temperature, °C. | | | | | | 50 | 50 | 50 | 50 | 50 |
| Aged Time, days | | | | | | 1 | 1 | 1 | 1 | 1 |
| Skin Over Time, min. | | | | | | 25 | 45 | 65 | 68 | 100 |
| Tack Free time, min. | | | | | | 180 | 190 | 200 | 250 | 400 |
| Aged Temperature, °C. | RT | RT | RT | RT | RT | RT | RT | RT | RT | RT |
| Aged Time, days | 69 | 69 | 69 | 69 | 69 | 3 | 3 | 3 | 3 | 3 |
| Skin Over Time, min. | 300 | 300 | 110 | 27 | 22 | 22 | 60 | 120 | 62 | 120 |
| Tack Free Time, min. | | | 255 | 60 | 75 | 130 | 140 | 300 | 150 | 280 |
| Aged Temperature, °C. | | | | | | 50 | 50 | 50 | 50 | 50 |
| Aged Time, days | | | | | | 3 | 3 | 3 | 3 | 3 |
| Skin Over Time, min. | | | | | | 20 | 20 | 20 | 60 | 90 |
| Tack Free Time, min. | | | | | | 120 | 120 | 120 | 160 | 240 |

Example 4

Polymer C (a trimethoxysilylated polypropylene oxide) was prepared by heating a mixture of 914.4 grams ACCLAIM 12200 (a polypropylene oxide polymer with OH endgroups, available commercially from Lyondell) with 50.4 grams SILQUEST A1310 (isocyanatopropyltrimethoxy silane, available commercially from Witco) in the presence of 0.1 grams METATIN 740 (a tin catalyst from Acima) at 70-80° C. for 1 hour.

Polymer C was used to prepare moisture curable compositions (Sample No. 23—Sample No. 32 in Table 4a). Table 4b shows performance data for these samples.

TABLE 4a

Cure Times of Aged Compositions
(Effect of Different Catalysts on Alkoxy Exchange Reactions)

| Components | Sample No./Wt. % | | | | | | | | | |
|---|---|---|---|---|---|---|---|---|---|---|
| | 23 | 24 | 25 | 26 | 27 | 28 | 29 | 30 | 31 | 32 |
| Polymer C - (EtO)$_3$Si PPO capped | 96.5 | 96.5 | 96.5 | 96.5 | 96.5 | 96.5 | 96.5 | 96.5 | 96.5 | 96.5 |
| Ti(OiPr)$_4$ catalyst | 0.3 | 0.3 | 0.3 | 0.3 | | | | | | |
| Sn catalyst | 0.2 | 0.2 | 0.2 | 0.2 | 0.5 | 0.5 | 0.5 | 0.5 | 0.5 | 0.5 |
| ViSi(OMe)$_3$ | 2.0 | 2.0 | 2.0 | 2.0 | 2.0 | 2.0 | 2.0 | 2.0 | 2.0 | 2.0 |
| NH$_2$NH$_2$CH$_2$NHPrSi(OMe)$_3$ | 1.0 | 1.0 | 1.0 | 1.0 | 1.0 | 1.0 | 1.0 | 1.0 | 1.0 | 1.0 |

TABLE 4b

Cure Times of Aged Compositions
(Effect of Different Catalysts on Alkoxy Exchange Reactions)

| Physical Properties | Sample No./Wt. % | | | | | | | | | |
|---|---|---|---|---|---|---|---|---|---|---|
| | 23 | 24 | 25 | 26 | 27 | 28 | 29 | 30 | 31 | 32 |
| Aged Temperature, °C. | RT | RT | 50 | 50 | RT | 50 | 50 | 50 | 50 | 50 |
| Aged Time, min. | 30 | 1440 | 120 | 240 | 1440 | 120 | 240 | 360 | 480 | 1440 |
| Skin Over Time, min. | 90 | 30 | 30 | 30 | 345 | 315 | 285 | 255 | 195 | 45 |

Example 5

Polymer D (a trimethoxysilylated polypropylene oxide) was prepared by heating a mixture of 920 grams ACCLAIM 12200 (a polypropylene oxide polymer with OH endgroups from Lyondell) with 44.9 grams SILQUEST Y5187 (isocyanatopropyltrimethoxysilane from Witco) in the presence of 0.1 grams METATIN 740 (a tin catalyst from Acima) at 70-80° C. for 1 hour.

Both Polymer C and Polymer D were used to prepare moisture curable compositions (Sample No. 33—Sample No. 37 in Table 5a). Cure speeds were detected after aging at 70° C. Before curing 0.2% Sn catalyst and 1% NH$_2$CH$_2$CH$_2$NHPrSi(OMe)$_3$ were added at room temperature. Table 5b shows performance data for these samples.

TABLE 5a

Cure Times of Aged Compositions
(Effects of Alkoxy Exchange Reactions)

| Components | Sample No./Wt. % | | | | |
|---|---|---|---|---|---|
| | 33 | 34 | 35 | 36 | 37 |
| Polymer D - (MeO)$_3$Si PPO capped | | | | 98.00 | 97.80 |
| Polymer C - (EtO)$_3$Si PPO capped | 98.00 | 97.80 | 97.80 | | |
| Ti(OPr)$_4$ catalyst | | 0.2 | 0.2 | | 0.2 |
| ViSi(MeO)$_3$ | 2.00 | 2.00 | | 2.00 | 2.00 |
| ViSi(EtO) | | | 2.00 | | |

TABLE 5b

Cure Times of Aged Compositions
(Effects of Alkoxy Exchange Reactions)

| Physical Properties | Sample No. | | | | |
|---|---|---|---|---|---|
| | 33 | 34 | 35 | 36 | 37 |
| Aged Temperature, ° C. | 70 | 70 | 70 | 70 | 70 |

TABLE 5b-continued

Cure Times of Aged Compositions
(Effects of Alkoxy Exchange Reactions)

| Physical Properties | Sample No. | | | | |
|---|---|---|---|---|---|
| | 33 | 34 | 35 | 36 | 37 |
| Aged Time, min. | 30 | 30 | 30 | 30 | 30 |
| Skin Over Time, min. | 180 | 20 | 150 | 10 | 10 |

What is claimed is:

1. A method of making an alkoxysilyl endcapped polymer, comprising the steps of:

reacting a first reactant having the structure:

HO—R—OH wherein R is a hydrocarbon diradical selected from the group consisting of polyesters, polyolefins, polyurethanes, poly(meth)acrylates and polyepoxide, any of which optionally includes heteroatom and/or silicone-containing linkages, and polysiloxanes, with a second reactant comprising a silyl having one end terminating with an isocyanate group and another end terminating with at least two alkoxy groups attached to a silicon atom thereof, wherein at least one of said alkoxy groups is not methoxy; and providing for reaction as a third reactant a methoxy silane in amounts and for a time sufficient to achieve alkoxy exchange with said alkoxysilyl endcapped polymer wherein said alkoxysilyl endcapped polymer includes methoxy groups.

* * * * *